United States Patent
Li et al.

(10) Patent No.: US 10,755,705 B2
(45) Date of Patent: Aug. 25, 2020

(54) METHOD AND ELECTRONIC DEVICE FOR PROCESSING VOICE DATA

(71) Applicant: Lenovo (Beijing) Co., Ltd., Beijing (CN)

(72) Inventors: Hongwei Li, Beijing (CN); Dekui Zhang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 80 days.

(21) Appl. No.: 15/813,916

(22) Filed: Nov. 15, 2017

(65) Prior Publication Data
US 2018/0286394 A1    Oct. 4, 2018

(30) Foreign Application Priority Data
Mar. 29, 2017  (CN) .......................... 2017 1 0198201

(51) Int. Cl.
| | | |
|---|---|---|
| *G10L 15/22* | (2006.01) | |
| *G10L 15/00* | (2013.01) | |
| *G10L 15/26* | (2006.01) | |
| *G10L 15/30* | (2013.01) | |
| *G10L 17/24* | (2013.01) | |
| *G06F 3/16* | (2006.01) | |

(52) U.S. Cl.
CPC .............. *G10L 15/22* (2013.01); *G06F 3/167* (2013.01); *G10L 15/00* (2013.01); *G10L 15/265* (2013.01); *G10L 15/30* (2013.01); *G10L 17/24* (2013.01); *G10L 2015/223* (2013.01)

(58) Field of Classification Search
CPC ......... G10L 15/32; G10L 15/22; G10L 15/00; G10L 15/265; G10L 15/30; G06F 3/167
See application file for complete search history.

(56) References Cited

U.S. PATENT DOCUMENTS

| | | | |
|---|---|---|---|
| 6,505,057 B1 * | 1/2003 | Finn | G10L 21/0208 455/557 |
| 6,538,689 B1 * | 3/2003 | Chang | G08B 13/19645 348/159 |
| 9,324,322 B1 * | 4/2016 | Torok | G10L 15/22 |
| 9,633,661 B1 * | 4/2017 | Typrin | G10L 17/22 |
| 9,728,188 B1 * | 8/2017 | Rosen | G10L 15/22 |
| 9,865,259 B1 * | 1/2018 | Typrin | G10L 17/22 |
| 10,346,737 B1 * | 7/2019 | Benitez | G06N 3/08 |
| 2003/0088423 A1 * | 5/2003 | Nishio | G10L 19/0208 704/500 |
| 2005/0060142 A1 * | 3/2005 | Visser | G10L 21/0208 704/201 |
| 2005/0060148 A1 * | 3/2005 | Masuda | G10L 17/00 704/231 |

(Continued)

FOREIGN PATENT DOCUMENTS

| | | |
|---|---|---|
| CN | 106095380 A | 11/2016 |
| CN | 106128459 A | 11/2016 |
| CN | 106469555 A | 3/2017 |

*Primary Examiner* — Daniel C Washburn
*Assistant Examiner* — Oluwadamilola M Ogunbiyi
(74) *Attorney, Agent, or Firm* — Anova Law Group, PLLC

(57) ABSTRACT

A data processing method includes acquiring voice data collected by at least two collecting devices from a voice source, acquiring a recognition result of the voice data that corresponds to a voice generated by the voice source, and executing a corresponding command in response to the recognition result.

14 Claims, 7 Drawing Sheets

(56) References Cited

U.S. PATENT DOCUMENTS

| | | | | |
|---|---|---|---|---|
| 2005/0216258 A1* | 9/2005 | Kobayashi | | H04M 3/56 704/205 |
| 2006/0100885 A1* | 5/2006 | Oh | | G10L 21/04 704/503 |
| 2008/0167869 A1* | 7/2008 | Nakadai | | G10L 15/20 704/233 |
| 2008/0226098 A1* | 9/2008 | Haulick | | G10L 21/0208 381/94.9 |
| 2008/0312918 A1* | 12/2008 | Kim | | G10L 15/01 704/233 |
| 2009/0018828 A1* | 1/2009 | Nakadai | | G10L 15/20 704/234 |
| 2009/0238377 A1* | 9/2009 | Ramakrishnan | | G10L 21/028 381/92 |
| 2011/0149690 A1* | 6/2011 | Okuda | | G01S 7/539 367/127 |
| 2011/0302436 A1* | 12/2011 | Clark | | H04W 52/0235 713/323 |
| 2013/0029684 A1* | 1/2013 | Kawaguchi | | H04R 3/005 455/456.1 |
| 2013/0142343 A1* | 6/2013 | Matsui | | G10L 21/028 381/56 |
| 2013/0162752 A1* | 6/2013 | Herz | | H04N 7/15 348/14.08 |
| 2013/0195285 A1 | 8/2013 | De La Fuente et al. | | |
| 2013/0289998 A1* | 10/2013 | Eller | | G10L 13/08 704/260 |
| 2013/0329908 A1* | 12/2013 | Lindahl | | G10L 21/0208 381/92 |
| 2014/0092007 A1* | 4/2014 | Kim | | H04N 5/4403 345/156 |
| 2015/0058003 A1* | 2/2015 | Mohideen | | G10L 15/20 704/233 |
| 2015/0106085 A1* | 4/2015 | Lindahl | | G10L 15/32 704/231 |
| 2015/0325251 A1* | 11/2015 | Dusan | | G10L 21/0216 704/226 |
| 2016/0105755 A1* | 4/2016 | Olsson | | G10L 21/0216 381/71.6 |
| 2016/0125911 A1* | 5/2016 | Hoarty | | G11B 20/02 369/4 |
| 2016/0179462 A1* | 6/2016 | Bjorkengren | | G06F 3/167 704/275 |
| 2017/0300990 A1* | 10/2017 | Tanaka | | G10L 17/005 |
| 2017/0330565 A1* | 11/2017 | Daley | | G10L 15/08 |
| 2017/0332168 A1* | 11/2017 | Moghimi | | H04R 3/005 |
| 2018/0122361 A1* | 5/2018 | Silveira Ocampo | | G10L 15/22 |
| 2018/0167581 A1* | 6/2018 | Goesnar | | H04L 12/1827 |
| 2018/0167715 A1* | 6/2018 | Graylin | | G10K 11/17827 |
| 2018/0184467 A1* | 6/2018 | Serbu | | H04W 76/38 |
| 2018/0227452 A1* | 8/2018 | Kato | | H04N 1/00891 |
| 2018/0247645 A1* | 8/2018 | Li | | G06F 3/167 |
| 2018/0277107 A1* | 9/2018 | Kim | | G10L 15/28 |
| 2018/0279016 A1* | 9/2018 | Tang | | H04N 21/8547 |
| 2019/0051306 A1* | 2/2019 | Torama | | G10L 15/00 |
| 2019/0180738 A1* | 6/2019 | Kim | | G10L 21/0216 |
| 2019/0260731 A1* | 8/2019 | Chandrasekharan | | G06F 3/165 |

\* cited by examiner

METHOD AND ELECTRONIC DEVICE FOR PROCESSING VOICE DATA

CROSS-REFERENCES TO RELATED APPLICATIONS

This application claims priority to Chinese Patent Application No. 201710198201.0, filed on Mar. 29, 2017, the entire contents of which are hereby incorporated by reference.

TECHNICAL FIELD

The present disclosure generally relates to the technical field of information processing and, more particularly, to a method and an electronic device for signal processing.

BACKGROUND

In the smart home environment, voice interaction has features such as allowing the user to liberate both hands and interact freely with smart devices. To further enable the user to implement voice interaction in multiple locations within the home space, some systems propose to utilize multiple voice collecting devices to collect the voice of the user, and when the user is near a certain voice collecting device, such voice collecting device may be utilized to obtain voice input of the user, thereby realizing distributed voice input.

However, the aforementioned systems only consider interaction between the user and the voice collecting devices when the user remains still. When the user moves in the home space, how to interact with a plurality of voice collecting devices remains an issue for the user to find a solution.

BRIEF SUMMARY OF THE DISCLOSURE

One aspect of the present disclosure provides a processing method. The method includes acquiring voice data collected by at least two collecting devices from a voice source, acquiring a recognition result of the voice data that corresponds to a voice generated by the voice source, and executing a corresponding command in response to the recognition result.

Another aspect of the present disclosure provides an electronic device including a communication interface and a processor coupled to the communication interface. The communication interface acquires voice data from at least two collecting devices from a voice source. The processor acquires a recognition result of the voice data that corresponds to a voice generated by the voice source, and executes a corresponding command in response to the recognition result.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions in embodiments of the present disclosure, drawings for describing the embodiments are briefly introduced below. Obviously, the drawings described hereinafter are only related to some embodiments of the present disclosure, and it is possible for those ordinarily skilled in the art to derive other drawings from such drawings without creative effort.

DETAILED DESCRIPTION

Various aspects and features of the present disclosure will be described hereinafter with reference to the accompanying drawings. It should be understood that, various modifications may be made to the disclosed embodiments. Thus, the specification shall not be construed as limiting, but is merely intended to illustrate examples of the embodiments. Other modifications obtainable by those skilled in the relevant art shall all fall within the scope and spirit of the present disclosure.

Figure 1:
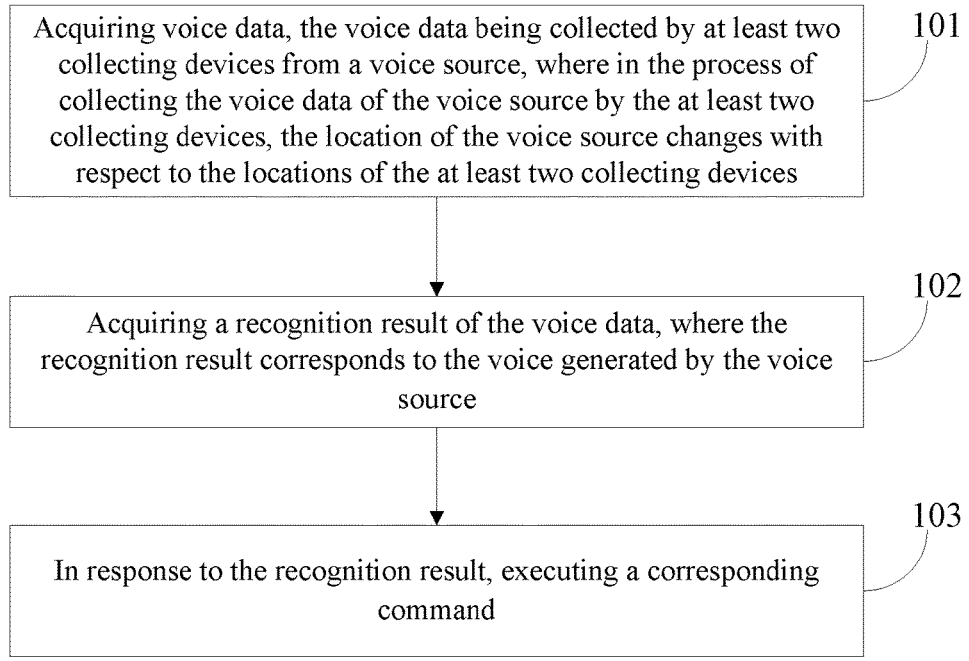
FIG. 1 illustrates a flow chart of a signal processing method consistent with the disclosure.

FIG. 1 illustrates a flow chart of a signal processing method consistent with the disclosure, as described in detail below.

101: acquiring voice data, where the voice data is collected by at least two collecting devices from a voice source. In the process of collecting the voice data of the voice source by the at least two collecting devices, the relative location of the voice source with respect to the at least two collecting devices changes.

Such technical solution may be applied to a first device, and the first device may be a computer, a server, etc. The first device may be connected to the at least two collecting devices through a wireless or wired connection. For example, a local area network may be applied to implement wireless connection between the first device and a plurality of collecting devices. Further, the first device may be, for example, configured for processing the voice data after receiving the voice data collected by the at least two collecting devices from the voice source.

In the present disclosure, a collecting device may also be referred to as a voice input device. The voice input device may include one or more microphones forming one or more arrays. Optionally, the one or more microphones may be arranged in another regular or irregular arrangement, and the present disclosure is not limited thereto.

In one embodiment, to provide feedback to the user, each collecting device may be further integrated with a voice output device (e.g., a speaker), and the voice output device may be configured for outputting voice feedback. Optionally, some of the collecting devices may be integrated with voice output devices, or no collecting device is integrated with a voice output device. That is, the voice output device may not be provided.

In one embodiment, the voice source may refer to but is not limited to a user. Hereinafter, the user is used as the voice source for illustrative purposes. The user may move around in an environment comprising a plurality of collecting devices, and when the user moves, the location of the user with respect to one or more of the collecting devices may change.

During the process that the relative location of the user with respect to different collecting devices changes, the voice signal(s) collected by certain collecting device(s) may be enhanced, and the voice signal(s) collected by certain other collecting device(s) may be diminished. Each collecting device may send the voice data collected correspondingly to the first device for further processing. As such, the voice data obtained by the first device may be voice data of the voice source collected by at least two collecting devices.

102: acquiring a recognition result of the voice data, where the recognition result corresponds to the voice generated by the voice source.

In one embodiment, recognition of the voice data may be performed by the first device locally. Under such situation, the first device may have a higher processing performance than that under other situations. For example, the first device may be configured in a home gateway, such that the voice data may be recognized by the first device within a relatively short time.

In another embodiment, the recognition of the voice data may be performed by a second device. The second device may be a back-end device. Under such situation, the voice data may be sent by the first device to the back-end device for recognition, and the first device may further receive the recognition result sent back by the back-end device.

Further, the recognition result corresponding to the voice generated by the voice source refers to the recognition result obtained by recognizing the voice made by the user. The recognition result may reflect the intention of the user expressed through voice interaction.

103: in response to the recognition result, executing a corresponding command. For example, a command may be generated based on the recognition result, and the command may be sent to one or more executing devices to be executed.

In one embodiment, an executing device that matches the voice source may be determined as a target executing device, and a command corresponding to the recognition result may be sent to the target executing device to realize control of the target executing device. More specifically, the executing device that matches the voice source may refer to an executing device closest to the voice source within a certain range. As such, the user can sensually (e.g., acoustically or visually) experience the execution result.

In another embodiment, the target executing device may be determined based on a configured operation, and a command corresponding to the recognition result may be sent to the target executing device. The user may freely select the device that needs a response. That is, the user may freely select the target executing device. For example, the user may instruct the first device about the target executing device that needs a response via a gesture operation. After detecting the gesture operation of the user, the first device may send a command to the target executing device. Such scenario may allow the user to control the executing device remotely or control the executing device that is relatively far away.

Figure 2:
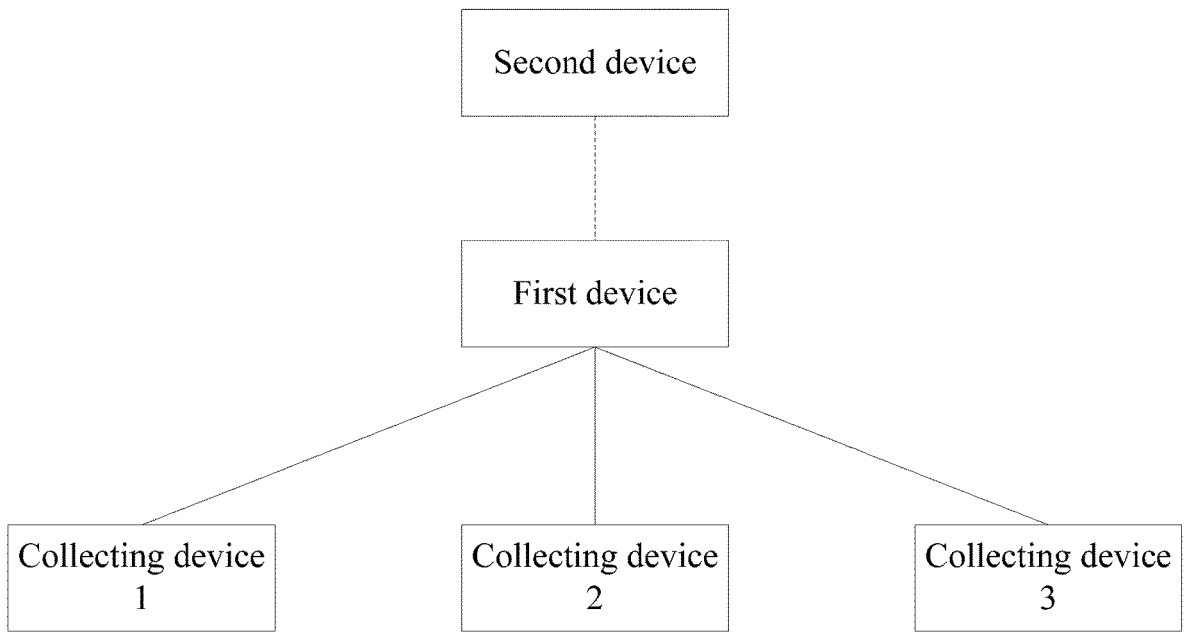
FIG. 2 illustrates a diagram of a communication architecture consistent with the disclosure.

FIG. 2 illustrates a diagram of a communication architecture consistent with the disclosure. As shown in FIG. 2, the communication architecture includes a first device and three collecting devices (collecting device 1, collecting device 2, and collecting device 3). Optionally, the communication architecture may further include a second device.

The number of collecting devices is not limited to three, i.e., the number of the collecting devices may be flexibly configured. In practical applications, the user may select any number of collecting devices based on actual need in a home scenario or another scenario.

Further, the first device may be coupled to the collecting device 1, the collecting device 2, and the collecting device 3, respectively. Optionally, as shown in FIG. 2, the first device may be further coupled to the second device.

Figure 3:
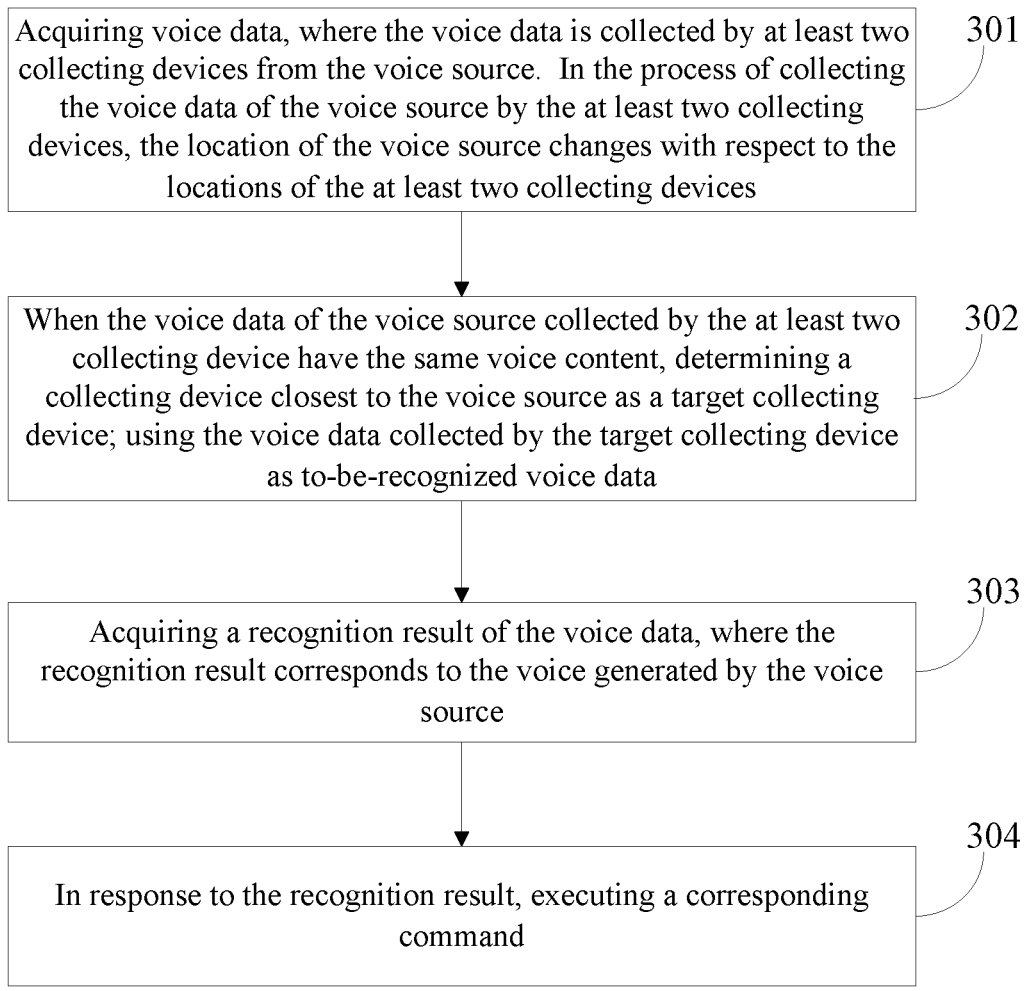
FIG. 3 illustrates a flow chart of another signal processing method consistent with the disclosure.

FIG. 3 illustrates a flow chart of another signal processing method consistent with the disclosure, as described in detail below.

301: acquiring voice data, where the voice data is collected by at least two collecting devices from a voice source. In the process of collecting the voice data of the voice source by the at least two collecting devices, the relative location of the voice source with respect to the at least two collecting devices changes.

Such technical solution of the present disclosure may be applied to a first device, and the first device may be a computer, or a server, etc. The first device may be connected to the at least two collecting devices through a wireless or wired connection. Often, wireless connection between the first device and a plurality of collecting devices may be implemented via a local area network.

As shown in FIG. 2, the communication architecture includes a first device and three collecting devices (collecting device 1, collecting device 2, and collecting device 3).

The number of collecting devices is not limited to three, i.e., the number of the collecting devices may be flexibly configured. In practical applications, the user may select any number of collecting devices based on actual needs in the home scenario or another scenario.

In some embodiments, to provide feedback to the user, the collecting device may be integrated with a voice output device (e.g., a speaker). But the collecting device may not necessarily be integrated with a voice output device. That is, the voice output device may not be provided.

The collecting device according to the present disclosure may also be referred to as a voice input device. The voice input device may include one or more microphones forming one or more arrays. When more microphones are included in the voice input device (i.e., the collecting device), the voice input device may be able to collect the voice of the voice source from a farther location.

In one embodiment, the voice source may refer to but is not limited to a user. Hereinafter, the user is used as the voice source for illustrative purposes. The user may move around in an environment including a plurality of collecting devices, and when the user moves, the location of the user with respect to one or more of the collecting devices may change. In the process that the relative distances between the voice source and different collecting devices change, the voice signal(s) collected by some collecting device(s) may be enhanced, and the voice signal(s) collected by some other collecting device(s) may be diminished.

Further, each collecting device may send the voice data collected correspondingly to the first device for processing. As such, the voice data obtained by the first device may be voice data of the voice source collected by the at least two collecting devices.

302: when the voice data of the voice source collected by the at least two collecting device has a same voice content, determining a collecting device closest to the voice source as a target collecting device. Further, the voice data collected by the target collecting device is used as to-be-recognized voice data.

In one embodiment, whether the voice contents collected by different collecting devices are the same can be determined based on a similarity between frequency waveforms of different voice data. For example, the voice data collected by the collecting device 1 may be denoted as sound wave 1, and the voice data collected by the collecting device 2 may be denoted as sound wave 2. When the similarity between the frequency waveforms of the sound wave 1 and the sound wave 2 exceeds a preset threshold, the collecting device 1 and the collecting device 2 are considered to have collected the same voice content.

On the other hand, if the similarity between the frequency waveforms of the sound wave 1 and the sound wave 2 does not reach the preset threshold, the collecting device 1 and the collecting device 2 may be considered to have collected different voice contents. In some embodiments, having different voice contents may refer to having completely different voice contents or having partially different voice contents.

Figure 4:
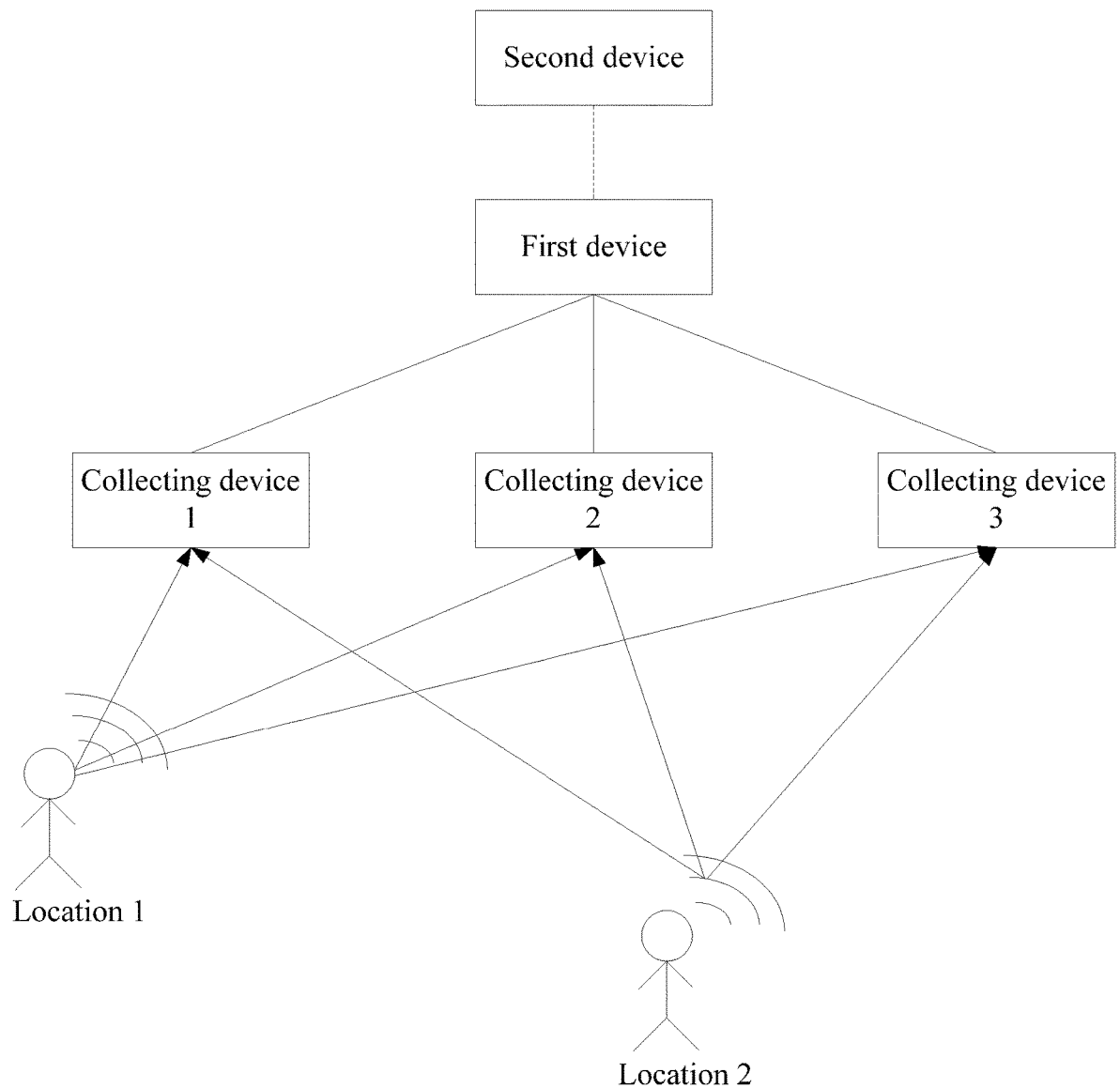
FIG. 4 illustrates a schematic view of a scene consistent with disclosed embodiments.

For example, FIG. 4 illustrates a schematic view of a scene consistent with disclosed embodiments. As shown in FIG. 4, a first device may be coupled to three collecting devices (collecting device 1, collecting device 2, and collecting device 3) to collect the voice data of a user, and a second device may be coupled to the first device.

Referring to FIG. 4, the user may be at a location 1 or a location 2. Either in location 1 or location 2, if the user makes a large enough voice, the collecting device 1, the collecting device 2, and the collecting device 3 may collect the same voice content from the user. Because the distances from the user to the three collecting devices (1, 2, and 3) may be different, the strengths of the voice data collected by the three collecting devices may be different.

More specifically, the strength of the voice data collected by the collecting device closest to the user may be the highest, and the strength of the voice data collected by the collecting device farthest from the user may be the lowest. That is, the shorter the distance between the user and a specific collecting device, the higher the strength of the voice data collected by the specific collecting device.

In some embodiments, the collecting device closest to the user may be determined to be a target collecting device, and the voice data collected by such collecting device (i.e., the voice data with the highest strength) may be acquired as the to-be-recognized voice data.

In one embodiment, a set of n collecting devices may be coupled to the first device, where n is an integer greater than 1. The at least two collecting devices may register with the first device, and the first device may recognize the at least two collecting device as V1, V2, . . . , Vn, respectively. Further, the first device may determine a distance between the user and each collecting device as: $\gamma_1, \gamma_2, \ldots, \gamma_n$. The voice data of the collecting device with a smallest distance from the user may be selected as the target collecting device.

The collecting device closest to the user can be determined according to one of various methods. The present disclosure is, however, not limited thereto.

In some embodiments, the collecting devices may determine their respective distances ($\gamma_1, \gamma_2, \ldots, \gamma_n$) to the user, and upload the determined distances $\gamma_1, \gamma_2, \ldots, \gamma_n$ to the first device. More specifically, each of the collecting devices may include a microphone array for performing signal processing locally, thereby realizing functions such as noise inhibition and echo cancellation, etc. Further, for a collecting device, by appropriately arranging the microphone array of the collecting device, the differences between the times that the user's voice arrives at different microphones of the microphone arrays can be measured, and the distance from the user to the microphone array, i.e., the collecting device, can be calculated.

In some embodiments, the microphone arrays of the collecting devices may be relatively simple and cannot determine the distances locally. In these embodiments, the first device may perform centralized determination of the distances from the user to the collecting devices. More specifically, different collecting devices may upload the locally received voice data of the user to the first device, and the first device may calculate the distances from the user to the collecting devices based on the moments at which the voice data is collected by different collecting devices. To avoid the impact of network delay on the voice collecting moments, the collecting devices may perform centralized packing of the collected voice data, and send the packed voice data to the first device for calculation of the distances.

Further, in one embodiment, when the user moves (e.g., the user moves from location 1 to location 2, as shown in FIG. 4), because the first device is able to dynamically evaluate the distances from the user to the collecting devices, the first device may, based on the change of the user's location, rapidly select the collecting device closest to the user as the voice input device with the desired effect (i.e., the target collecting device).

303: acquiring a recognition result of the voice data, where the recognition result corresponds to the voice generated by the voice source.

In one embodiment, recognition of the voice data may be performed by the first device locally. Under such situation, the first device may have a higher processing performance. For example, the first device may be configured in a home gateway.

In another embodiment, the recognition of the voice data may be performed by a second device. Optionally, the second device may be a back-end device. Under such situation, the voice data may be sent by the first device to the back-end device for recognition, and the first device may further receive the recognition result sent by the back-end device.

Further, the recognition result corresponding to the voice generated by the voice source refers to a result obtained by recognizing the voice made by the user. The recognition result may reflect the intention of the user expressed through voice interaction.

304: in response to the recognition result, executing a corresponding command.

In one embodiment, the command may be generated based on the recognition result, and the command may be sent to one or more executing devices to be executed.

In one embodiment, an executing device that matches the voice source may be determined as a target executing device, and a command corresponding to the recognition result may be sent to the target executing device to realize control of the target executing device. More specifically, the executing device that matches the voice source may refer to an executing device closest to the voice source within a certain range. As such, the user can sensually (e.g., acoustically or visually) experience the execution result.

In another embodiment, the target executing device may be determined based on a configured operation, and a command corresponding to the recognition result may be sent to the target executing device. The user may freely select the device that needs a response. That is, the user may freely select the target executing device. For example, the user may instruct the first device about the target executing device that needs a response via a gesture operation. After detecting the gesture operation of the user, the first device may send a command to the target executing device. Such scenario may allow the user to control the executing device remotely or control the executing device that is relatively far away.

Figure 5:
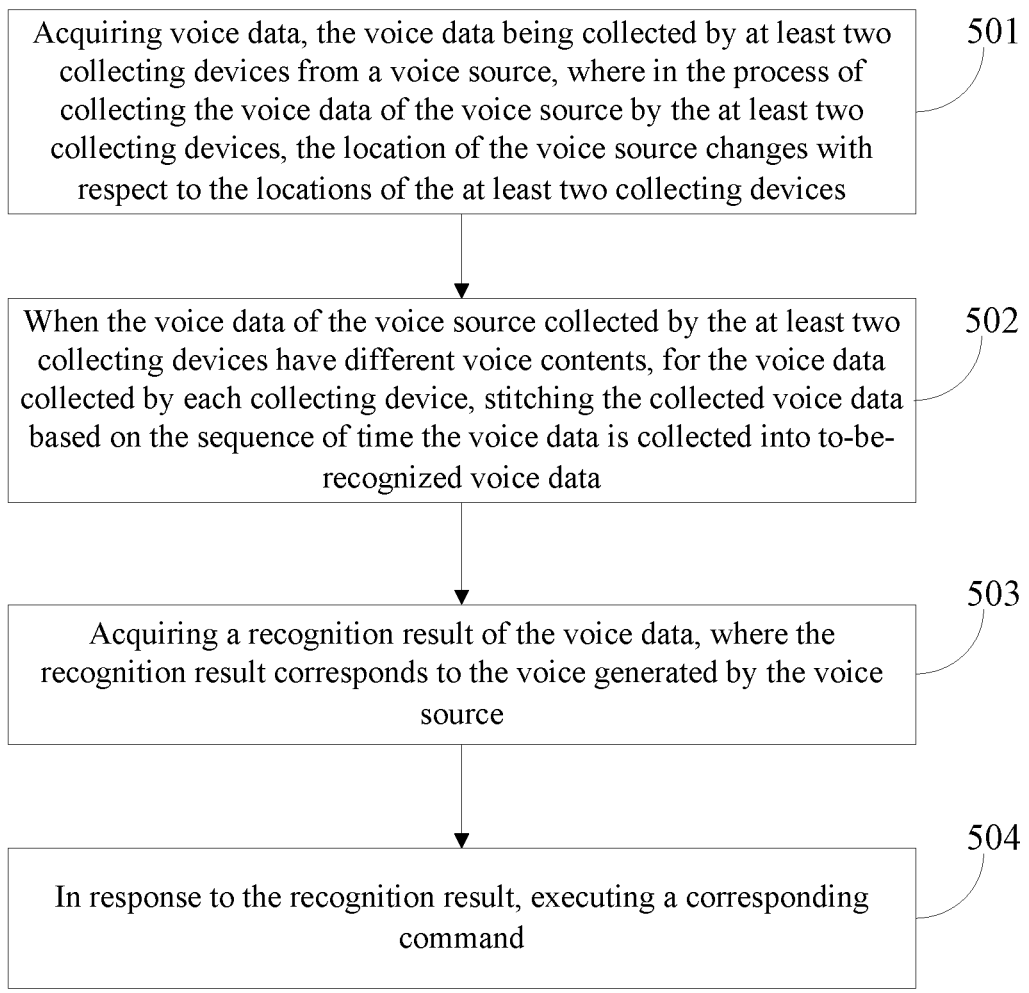
FIG. 5 illustrates a flow chart of another signal processing method consistent with the disclosure.

FIG. 5 illustrates a flow chart of another signal processing method consistent with the disclosure, as described in detail below.

501: acquiring voice data, where the voice data is collected by at least two collecting devices from a voice source. In the process of collecting the voice data of the voice source by the at least two collecting devices, the relative location of the voice source with respect to the at least two collecting devices changes.

Technical solutions of the present disclosure may be applied to a first device, and the first device may be a computer, or a server, etc. The first device may be connected to the at least two collecting devices through a wireless or wired connection. Often, wireless connection between the first device and a plurality of collecting devices may be implemented via a local area network.

Referring to FIG. 2, FIG. 2 illustrates three collecting devices. More specifically, the three collecting devices (i.e., a collecting device 1, a collecting device 2, and a collecting device 3) may be connected to the first device. It should be understood that the number of collecting devices is not limited to three, i.e., the number of the collecting devices may be flexibly configured. In practical applications, the user may select any number of collecting devices based on actual needs in the home scenario or another scenario.

Further, to provide feedback to the user, each collecting device may be configured with a voice output device (e.g., a speaker) into an integral piece, and the voice output device may be configured for outputting voice feedback. Optionally, some or all of the collecting devices may not necessarily be integrated with a voice output device. That is, the voice output device may not be provided.

Often, the collecting device according to the present disclosure may also be referred to as a voice input device. The voice input device may include one or more microphones forming one or more arrays.

In one embodiment, the voice source may refer to but is not limited to a user. Hereinafter, the user is used as the voice source for illustrative purposes. The user may move around in an environment comprising a plurality of collecting devices, and when the user moves, the location of the user with respect to one or more of the collecting devices may change. In the process that the relative distances between the voice source and different collecting devices change, the voice signal(s) collected by certain collecting device(s) may be enhanced, and the voice signal(s) collected by some other collecting device(s) may be diminished.

Further, each collecting device may send the voice data collected correspondingly to the first device for processing. Thus, the voice data obtained by the first device may be voice data of the voice source collected by the at least two collecting devices.

502: when the voice data of the voice source collected by the at least two collecting devices have different voice contents, stitching the voice data collected by the collecting device in the order of timings at which the voice data is collected. The stitched voice data is used as to-be-recognized voice data.

In one embodiment, whether the voice contents collected by different collecting devices are the same can be determined based on a similarity between frequency waveforms of different voice data. For example, the voice data collected by the collecting device 1 may be denoted as sound wave 1, and the voice data collected by the collecting device 2 may be denoted as sound wave 2. When the similarity between the frequency waveforms of the sound wave 1 and the sound wave 2 exceeds a preset threshold, the collecting device 1 and the collecting device 2 are considered to have collected the same voice content.

On the other hand, if the similarity between the frequency waveforms of the sound wave 1 and the sound wave 2 does not reach the preset threshold, the collecting device 1 and the collecting device 2 may be considered to have collected different voice contents. In some embodiments, having different voice contents may refer to having completely different voice contents or having partially different voice contents.

As shown in FIG. 4, during a certain period of time, the user may move from location 1 to location 2. If the user's voice is relatively small, or the user is relatively far from one or more of the collecting devices, or the wave-filtering performance of the collecting device is superior, the collecting device 1, the collecting device 2, and the collecting device 3 may collect different voice contents of the user. For example, the collecting device 1 may collect voice content AB, the collecting device 2 may collect voice content CD, and the collecting device 3 may collect voice content EFG.

Based on the sequence of timings at which the voice data is collected, the voice contents (i.e., AB, CD, and EFG) may be stitched together to obtain the to-be-recognized voice data. Thus, when the user moves freely, the first device may stitch different voice contents together to obtain the complete voice message delivered by the user.

In one embodiment, the number of users may not be limited to one. That is, a plurality of collecting devices may be configured for collecting voice or voice data from one or more users. For example, two users (user 1 and user 2) may want to perform voice interaction with the first device via the collecting devices. Because the first device is connected to the plurality of collecting devices, one or more of the collecting devices may collect the voice of user 1 and one or more of the collecting devices may collect the voice of user 2.

Further, to identify the collecting devices that collect voice or voice data from the same user, the voiceprint properties of the voices of the user 1 and the user 2 may be compared.

That is, the voiceprint property may be applied to differentiate the voices from different users.

Further, based on the voiceprint property of the voice source, collecting devices for which corresponding voice data needs to be "stitched" may be determined. Such collecting devices are also referred to as "to-be-stitched collecting devices." The voice data collected by the to-be-stitched collecting devices may be stitched based on the sequence of timings that each voice data is collected.

Two situations may exist for processing the stitched voice data including voice data collected by the collecting devices based on the sequence of the timings that the voice data is collected. In the first situation, the stitched voice data may, for example, include a first content and a second content, and the first content and the second content included in the stitched voice data may be the same. Further, the time periods that the first content and the second content are collected may be overlapped. Thus, a target content satisfying a preset condition may be selected from the first content and the second content. The first content and the second content may be replaced with the target content to obtain the to-be-recognized voice data.

For example, collecting device 1 may collect voice data ABc, and collecting device 2 may collect voice data bCD, where B and b represent the same content with different voice strengths, and C and c represent the same content with different voice strengths. When the voice data ABc and the voice data bCD are stitched, voice data of ABcbCD may be obtained based on the time sequence.

Further, the stitched voice data may be found to have the same voice content Bc and bC. According to a preset condition, B and C with higher voice strengths may be selected as the target content. By replacing voice content BcbC with voice content BC, voice data ABCD can be obtained and may be used as the to-be-recognized voice data. Such processing procedure may ensure a relatively high strength of the voice data for subsequent recognition.

In the second situation, the stitched voice data does not include the same and adjacent voice content. Thus, the voice data may be stitched directly based on the sequence of timings, and no further processing may be needed. For example, collecting device 1 may collect voice data AB, and collecting device 2 may collect voice data CD. Because voice data AB and voice data CD do not have the same voice content, voice data ABCD is obtained directly via stitching based on the time sequence and is used as the to-be-recognized voice data.

503: acquiring a recognition result of the voice data, where the recognition result corresponds to the voice generated by the voice source.

In one embodiment, recognition of the voice data may be performed by the first device locally. Under such situation, the first device may have a higher processing performance than that under other situations. For example, the first device may be configured in a home gateway, such that the voice data may be recognized by the first device within a relatively short time.

In another embodiment, the recognition of the voice data may be performed by a second device. The second device may be a back-end device. Under such situation, the voice data may be sent by the first device to the back-end device for recognition, and the first device may further receive the recognition result sent back by the back-end device.

Further, the recognition result corresponding to the voice generated by the voice source refers to the recognition result obtained by recognizing the voice made by the user. The recognition result may reflect the intention of the user expressed through voice interaction.

504: in response to the recognition result, executing a corresponding command. In one embodiment, a command may be generated based on the recognition result, and the command may be sent to one or more executing devices to be executed.

In one embodiment, an executing device that matches the voice source may be determined as a target executing device, and a command corresponding to the recognition result may be sent to the target executing device to realize control of the target executing device. More specifically, the executing device that matches the voice source may refer to an executing device closest to the voice source within a certain range. As such, the user can sensually (e.g., acoustically or visually) experience the execution result.

In another embodiment, the target executing device may be determined based on a configured operation, and a command corresponding to the recognition result may be sent to the target executing device. The user may freely select the device that needs a response. That is, the user may freely select the target executing device. For example, the user may instruct the first device about the target executing device that needs a response via a gesture operation. After detecting the gesture operation of the user, the first device may send a command to the target executing device. Such scenario may allow the user to control the executing device remotely or control the executing device that is relatively far away.

Figure 6:
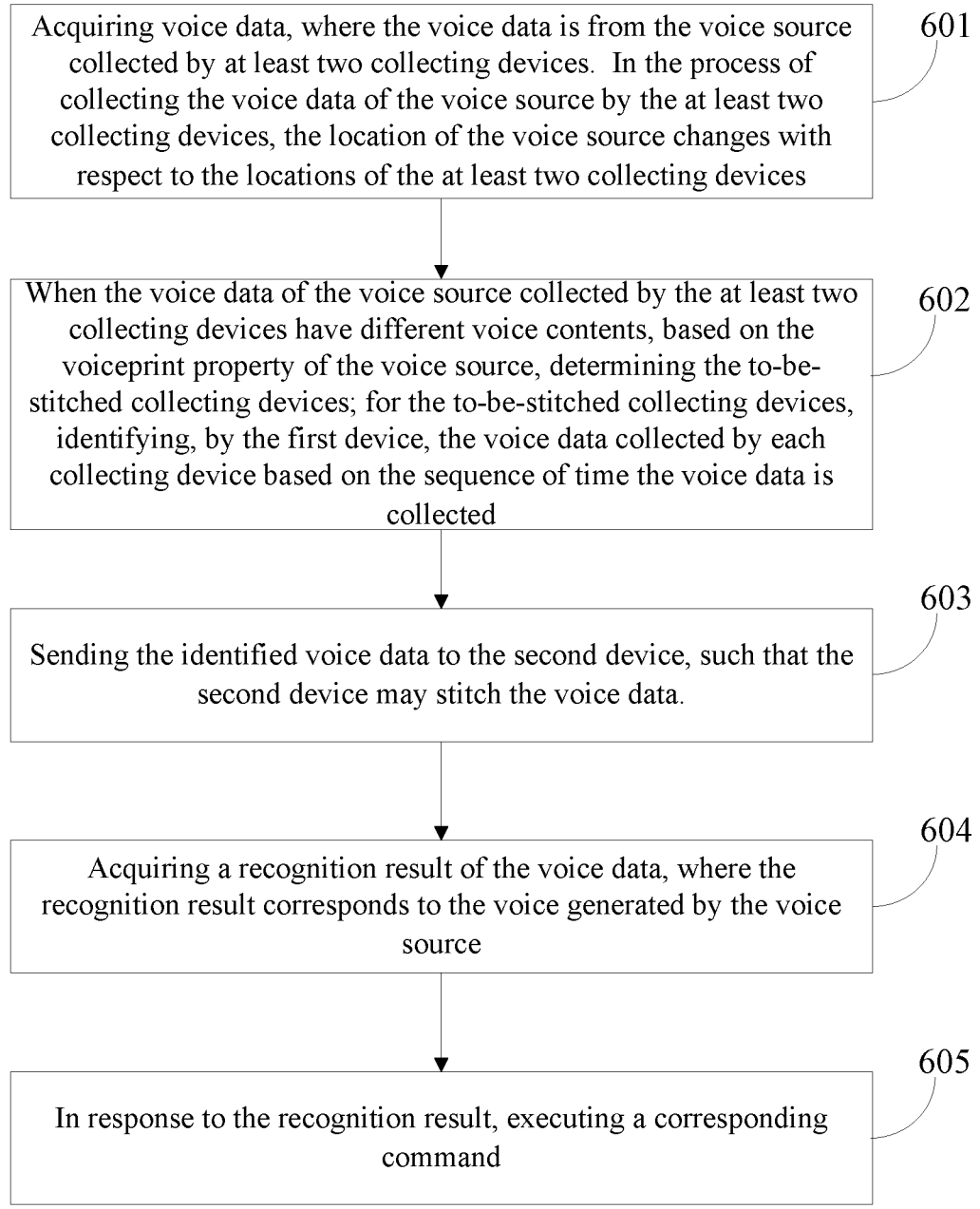
FIG. 6 illustrates a flow chart of another signal processing method consistent with the disclosure.

FIG. 6 illustrates a flow chart of another signal processing method consistent with the disclosure, as described in detail below.

601: acquiring voice data, where the voice data is from the voice source collected by at least two collecting devices. In the process of collecting the voice data of the voice source by the at least two collecting devices, the relative location of the voice source changes with respect to the locations of the at least two collecting devices.

Technical solutions of the present disclosure may be applied to a first device, and the first device may be a computer, or a server, etc. The first device may be connected to the at least two collecting devices, and the connection may be a wireless connection or a wired connection. Often, wireless connection between the first device and a plurality of collecting devices may be implemented via a local area network.

As shown in FIG. 2, the communication architecture may include three collecting devices, and a first device may be connected to the three collecting devices (a collecting device 1, a collecting device 2, and a collecting device 3). The number of collecting devices may not be limited to three, that is, the number of the collecting devices may be flexibly configured. In practical applications, the user may select any number of collecting devices based on needs in the home scenario or other scenarios.

Often, to provide feedback to the user, the collecting device may be integrated with a voice output device (e.g., a speaker). Optionally, the collecting device may not necessarily be integrated with a voice output device. That is, the voice output device may not be provided.

Often, the collecting device according to the present disclosure may also be referred to as a voice input device. The voice input device may include one or more microphones forming one or more arrays.

In one embodiment, the voice source may refer to but is not limited to a user. Hereinafter, the user is used as the voice source for illustrative purposes. The user may move around in an environment comprising a plurality of collecting devices, and when the user moves, the location of the user with respect to one or more of the collecting devices may change, respectively. In the process that the relative distances between the voice source and different collecting devices change, the voice signal(s) collected by certain collecting device(s) may be enhanced, and the voice signal(s) collected by certain collecting device(s) may be diminished.

Each collecting device may send the voice data collected correspondingly to the first device for processing.

Thus, the voice data obtained by the first device may be voice data of the voice source collected by the at least two collecting devices.

602: when the voice data of the voice source collected by the at least two collecting devices have different voice contents, determining the to-be-stitched collecting devices based on the voiceprint property of the voice source. Further, for the to-be-stitched collecting devices, the first device may identify the voice data collected by the collecting devices based on a sequence of timings at which the voice data is collected.

In one embodiment, whether the voice contents collected by different collecting devices are the same can be determined based on a similarity between frequency waveforms of different voice data. For example, the voice data collected by the collecting device 1 may be denoted as sound wave 1, and the voice data collected by the collecting device 2 may be denoted as sound wave 2. When the similarity between the frequency waveforms of the sound wave 1 and the sound wave 2 exceeds a preset threshold, the collecting device 1 and the collecting device 2 are considered to have collected the same voice content.

On the other hand, if the similarity between the frequency waveforms of the sound wave 1 and the sound wave 2 does not reach the preset threshold, the collecting device 1 and the collecting device 2 may be considered to have collected different voice contents. In some embodiments, having different voice contents may refer to having completely different voice contents or having partially different voice contents.

As shown in FIG. 4, during a certain period of time, the user may move from location 1 to location 2. If the user's voice is relatively small, or the user is relatively far from one or more of the collecting devices, or the wave-filtering performance of the collecting device is superior, the collecting device 1, the collecting device 2, and the collecting device 3 may collect different voice contents of the user. For example, the collecting device 1 may collect voice content AB, the collecting device 2 may collect voice content CD, and the collecting device 3 may collect voice content EFG.

Based on the sequence of timings at which the voice data is collected, the voice contents (i.e., AB, CD, and EFG) may be stitched together to obtain the to-be-recognized voice data. Thus, when the user moves freely, the first device may stitch different voice contents together to obtain the complete voice message delivered by the user.

In some embodiments, a second device (i.e., a back-end device) can be used to stitch the voice data. When the back-end device performs stitching of the voice data, the back-end device may not know what sequence shall be applied for stitching the voice data. Thus, the first device needs to determine the to-be-stitched collecting devices based on the voiceprint property of the voice source. For the to-be-stitched collecting devices, the voice data collected by the collecting devices may be identified based on the sequence of timings that the voice data is collected, for example, using identifications. The back-end device can determine the stitching order based on the identifications.

603: sending the identified voice data to a second device, such that the second device stitches the voice data. In one embodiment, two situations may exist when the second device stitches the voice data collected by the collecting devices based on the sequence of the timings that the voice data is collected.

In the first situation, if a first content and a second content included in the stitched voice data are the same and the time periods that the first content and the second content are collected may be overlapped, a target content satisfying a preset condition may be selected from the first content and the second content. The first content and the second content may be replaced with the target content to obtain the to-be-recognized voice data.

For example, the collecting device 1 may collect voice content ABc, and the collecting device 2 may collect voice content bCD, where B and b represent the same content with different voice strengths, and C and c represent the same content with different voice strengths. During the stitching process, ABcbCD may be stitched based on sequence of time, and the same content Bc and bC may be identified. Further, B and C with higher voice strengths may be selected as the target content, and by replacing BcbC with BC, ABCD can be obtained. Such processing procedure ensures a relatively high strength of the voice data for the subsequent recognition.

In the second situation, if the stitched voice data does not include the repeated and adjacent contents, the voice data may be stitched directly based on sequence of time. For example, collecting device 1 may collect voice content AB, and collecting device 2 may collect voice content CD. Thus, voice data ABCD is obtained directly via stitching based on the time sequence.

604: acquiring a recognition result of the voice data, where the recognition result corresponds to the voice generated by the voice source.

In one embodiment, recognition of the voice data may be performed by the first device locally. Under such situation, the first device may have a higher processing performance than that under other situations. For example, the first device may be configured in a home gateway, such that the voice data may be recognized by the first device within a relatively short time. More specifically, the first device may receive the stitched voice data sent by the back-end device, and perform recognition on the stitched voice data to obtain the recognition result.

In another embodiment, the recognition of the voice data may be performed by the second device. Optionally, the second device may be a back-end device. Under such situation, the voice data may be sent by the first device to the back-end device for recognition, and the first device may further receive the recognition result sent by the second device.

Further, the recognition result corresponding to the voice generated by the voice source refers to the recognition result obtained by recognizing the voice made by the user. The recognition result may reflect the intention of the user expressed through voice interaction.

605: in response to the recognition result, executing a corresponding command. In one embodiment, the command may be generated based on the recognition result, and the command may be sent to one or more executing device to be executed.

In one embodiment, an executing device that matches the voice source may be determined as a target executing device, and a command corresponding to the recognition result may be sent to the target executing device to realize control of the target executing device. More specifically, the executing device that matches the voice source may refer to an executing device closest to the voice source within a certain range. As such, the user can sensually (e.g., acoustically or visually) experience the execution result.

In another embodiment, the target executing device may be determined based on a configured operation, and the command corresponding to the recognition result may be sent to the target executing device. The user may freely choose the device that needs response, i.e., the target executing device. For example, the user may instruct the first device about the target executing device that needs a response via a gesture operation. After detecting the gesture operation of the user, the first device may send a command to the target executing device. Such configuration may allow the user to control the executing device remotely or the executing device that is relatively far away.

Figure 7:
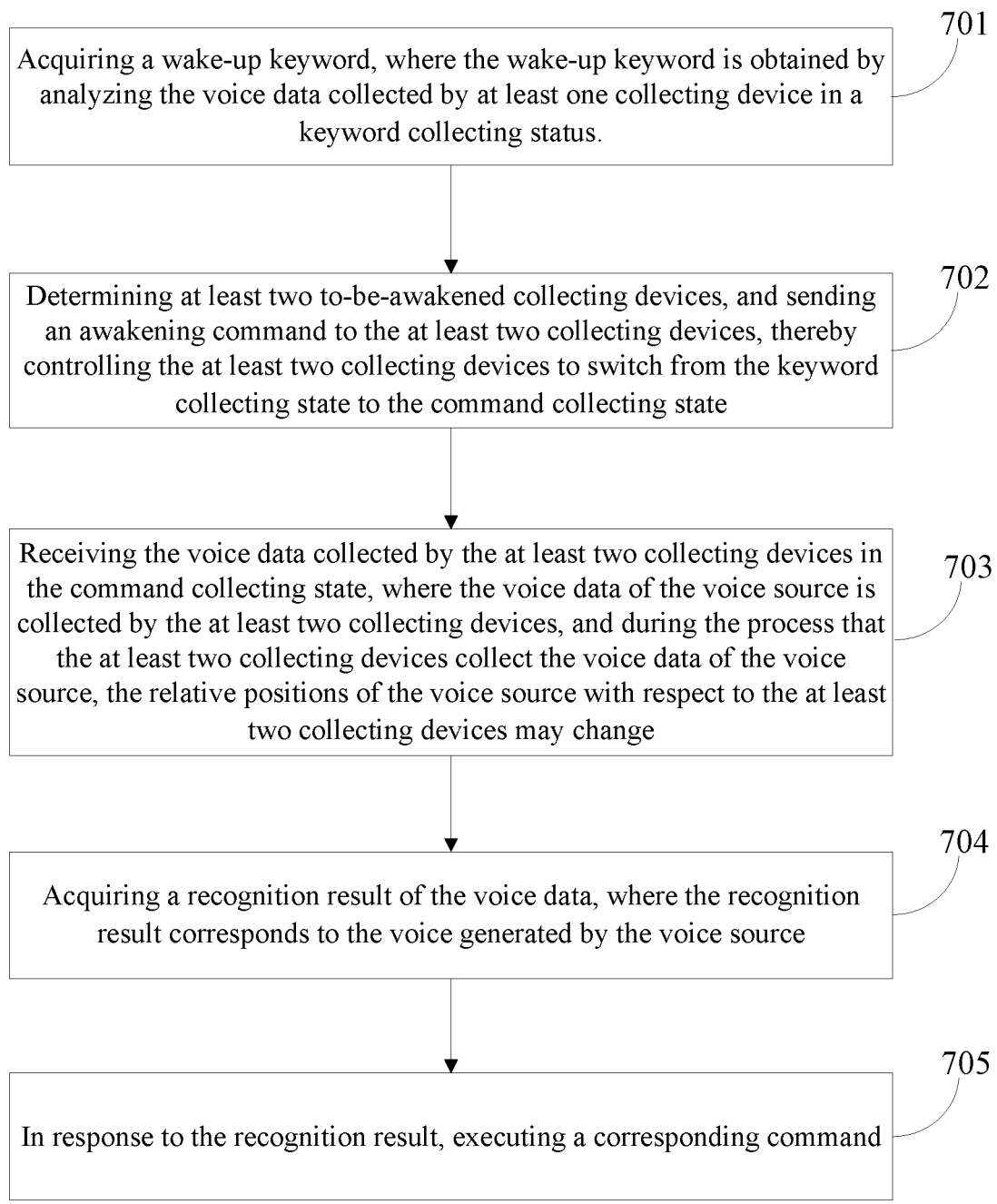
FIG. 7 illustrates a flow chart of another signal processing method consistent with the disclosure.

FIG. 7 illustrates a flow chart of another signal processing method consistent with the disclosure, as described in detail below.

701: acquiring a wake-up keyword, where the wake-up keyword is obtained by at least one collecting device through analyzing the collected voice data in a keyword collecting state.

Technical solutions of the present disclosure may be applied to a first device, and the first device may be a computer, or a server, etc. The first device may be connected to the at least two collecting devices, and the connection may be a wireless connection or a wired connection. In some embodiments, wireless connection between the first device and a plurality of collecting devices may be implemented via a local area network.

Referring to FIG. 2, the communication architecture may include a first device and three collecting devices. The first device is connected to collecting device 1, collecting device 2, and collecting device 3. However, the number of collecting devices may not be limited to three, that is, the number of the collecting devices may be flexibly configured. In practical applications, the user may select any number of collecting devices based on needs in the home scenario or another scenario.

In some embodiments, to provide feedback to the user, the collecting device may be integrated with a voice output device (e.g., a speaker). Optionally, the collecting device may not necessarily be integrated with a voice output device. That is, the voice output device may not be provided.

The collecting device according to the present disclosure may also be referred to as a voice input device. The voice input device may include one or more microphones forming one or more arrays.

In one embodiment, the collecting device may have two collecting states (collecting modes): keyword collecting state (keyword collecting mode) and command collecting state (command collecting mode). In the keyword collecting state, the collecting device may collect the voice data and perform keyword analysis of the voice data. In the command collecting state, a collecting device may send the collected voice data to the first device for subsequent recognition and corresponding command control.

For example, when the collecting device is started or initiated, the collecting device may enter the keyword collecting state by default, and the collecting device may collect the voice data and perform keyword analysis of the voice data. If a wake-up keyword is obtained after analysis, the wake-up keyword may be sent to the first device.

In one example, the wake-up keyword may be "hello, XXX." When the collecting device obtains the wake-up keyword "hello, XXX" after analysis, the wake-up keyword "hello, XXX" may be sent to the first device. If the collecting device does not obtain the wake-up keyword "hello, XXX" after the analysis, the currently collected voice data and the subsequently collected voice data may not be sent to the first device.

Optionally, the first device may receive a wake-up keyword sent by one collecting device, or the first device may receive wake-up keywords sent by two or more collecting devices. The present disclosure is not limited thereto.

702: determining at least two to-be-awakened collecting devices, and sending an awakening command to the at least two collecting devices, thereby controlling the at least two collecting devices to switch from the keyword collecting state to the command collecting state.

In one embodiment, determining the at least two to-be-awakened collecting devices may include considering all collecting devices under control as the to-be-awakened collecting devices and send the awakening command to all of the collecting devices. When the collecting devices receive the awakening command, the collecting devices may switch from the keyword collecting state to the command collecting state.

Further, when the collecting devices are in the command collecting state, the collecting devices may send the collected voice data to the first device for subsequent recognition and corresponding command control.

In another embodiment, determining the at least two to-be-awakened collecting devices may include determining a collecting device that obtained the wake-up keyword after analysis as a master collecting device and determining one or more collecting devices that did not obtain the wake-up keyword after analysis as one or more slave collecting devices. Optionally, more than one collecting device may obtain the wake-up keyword after analysis, and thus two or more collecting devices may be determined as the master collecting devices. That is, the number of master collecting devices may be one or more.

Further, the master collecting device and the slave collecting device(s) that satisfy a preset spatial condition with respect to the master collecting device may be determined as the to-be-awakened collecting devices. Further, an awakening command may be sent to the to-be-awaken collecting devices. When the to-be-awakened collecting devices receive the awakening command, such collecting devices may switch from the keyword collecting state to the command collecting state. In the command collecting state, the aforementioned collecting device may send the subsequently collected voice data to the first device for subsequent recognition and corresponding command control.

Optionally, determining the master collecting device and the slave collecting device(s) satisfying the preset spatial condition with the master collecting device as the to-be-awakened collecting devices may include: determining the master collecting device and the slave collecting device(s) within a pre-determined distance to the master collecting device as the to-be-awakened collecting devices; or determining the master collecting device and the slave collecting device(s) in a same spatial area (e.g., a same room) as the master collecting device as the to-be-awakened collecting devices.

In one example, the user may make an awakening sound at a position D1 (within area M1), and one or more collecting devices in the area M1 may collect such awakening sound. Further, all collecting devices in area M1, and areas M2 and M3 that are close to the region M1 may be determined as the to-be-awakened collecting devices.

In another example, the user may make an awakening sound at position D1 (within area M1), and the collecting devices in area M1 may collect the awakening sound, such that all collecting devices in area M1 may be determined as the to-be-awakened collecting devices.

Taking into consideration that the user may move around with respect to the collecting devices, different master collecting devices may be used at different moments, and correspondingly, the slave collecting devices determined based on the master collecting device may be changed. Thus, the to-be-awakened collecting devices may be updated in real-time based on the movement of the user.

More specifically, at moment T1, a wake-up keyword sent by a first collecting device may be obtained, and a current to-be-awakened collecting device is determined to be a collecting device within a first area. At moment T2, the wake-up keyword sent by a second collecting device may be obtained, and a current to-be-awakened collecting device is determined to be a collecting device within a second area.

Optionally, T2 may be a moment later than T1, and the first and second areas have non-overlapping regions. For example, the first and second areas may be partially non-overlapped, i.e., part of the first area is outside the second area and part of the second area is outside the first area. As another example, the first and second areas may be completely non-overlapped, i.e., each of the first and second areas is completely outside the other one of the first and second areas.

Further, the awakening command may be sent to the collecting device(s) in a first sub-area within the second area, and a sleeping command may be sent to the collecting device(s) in a second sub-area within the first area. The sleeping command may be configured for controlling a collecting device to switch from the command-collecting state to the keyword-collecting state or to keep in the keyword-collecting state.

Further, the first sub-area may refer to a part of the second area that does not overlap with the first area. The second sub-area may refer to a part of the first area that does not overlap with the second area.

Thus, the master collecting device may be implemented as a "center," and the slave collecting device(s) may be arranged in a radiated shape with respect to the master collecting device. Further, the slave collecting devices may be in the command collecting state.

In the aforementioned solution, the second area may entirely overlap with the first area. Correspondingly, the awakening command or sleeping command no longer needs to be sent to the collecting devices.

According to the present disclosure, the wake-up keyword from one collecting device may be applied to wake up a plurality of associated collecting devices.

703: receiving the voice data collected by the at least two collecting devices in the command collecting state, where the voice data refers to voice data collected by the at least two collecting devices from a voice source. During the process that the at least two collecting devices collect the voice data of the voice source, the relative positions of the voice source with respect to the at least two collecting devices may change.

In one embodiment, the voice source may refer to but is not limited to a user. Hereinafter, the user is used as the voice source for illustrative purposes. The user may move around in an environment comprising a plurality of collecting devices, and when the user moves, the location of the user with respect to one or more of the collecting devices may change.

During the process that the relative location of the user with respect to different collecting devices changes, the voice signal(s) collected by certain collecting device(s) may be enhanced, and the voice signal(s) collected by certain other collecting device(s) may be diminished. Each collecting device may send the voice data collected correspondingly to the first device for further processing. As such, the voice data obtained by the first device may be voice data of the voice source collected by at least two collecting devices.

704: acquiring a recognition result of the voice data, where the recognition result corresponds to the voice generated by the voice source.

In one embodiment, recognition of the voice data may be performed by the first device locally. Under such situation, the first device may have higher processing performance. For example, the first device may be configured in a home gateway.

In another embodiment, the recognition of the voice data may be performed by a second device. Optionally, the second device may be a back-end device. Under such situation, the voice data may be sent by the first device to the back-end device for recognition, and the first device may further receive the recognition result sent by the back-end device.

In one embodiment, the recognition result corresponding to the voice generated by the voice source refers to the recognition result obtained by recognizing the voice made by the user. The recognition result may reflect the intention of the user expressed through voice interaction.

705: in response to the recognition result, executing a corresponding command. In one embodiment, the command may be generated based on the recognition result, and the command may be sent to one or more executing device to be executed.

In one embodiment, an executing device that matches the voice source may be determined as a target executing device, and a command corresponding to the recognition result may be sent to the target executing device to realize control of the target executing device. More specifically, the executing device that matches the voice source may refer to an executing device closest to the voice source within a certain range. As such, the user can sensually (e.g., acoustically or visually) experience the execution result.

In another embodiment, the target executing device may be determined based on a configured operation, and the command corresponding to the recognition result may be sent to the target executing device. The user may freely choose the device that needs response, i.e., the target executing device. For example, the user may instruct the first device about the target executing device that needs a response via a gesture operation. After detecting the gesture operation of the user, the first device may send a command to the target executing device. Such configuration may allow the user the control the executing device remotely or the executing device that is relatively far away.

Figure 8:
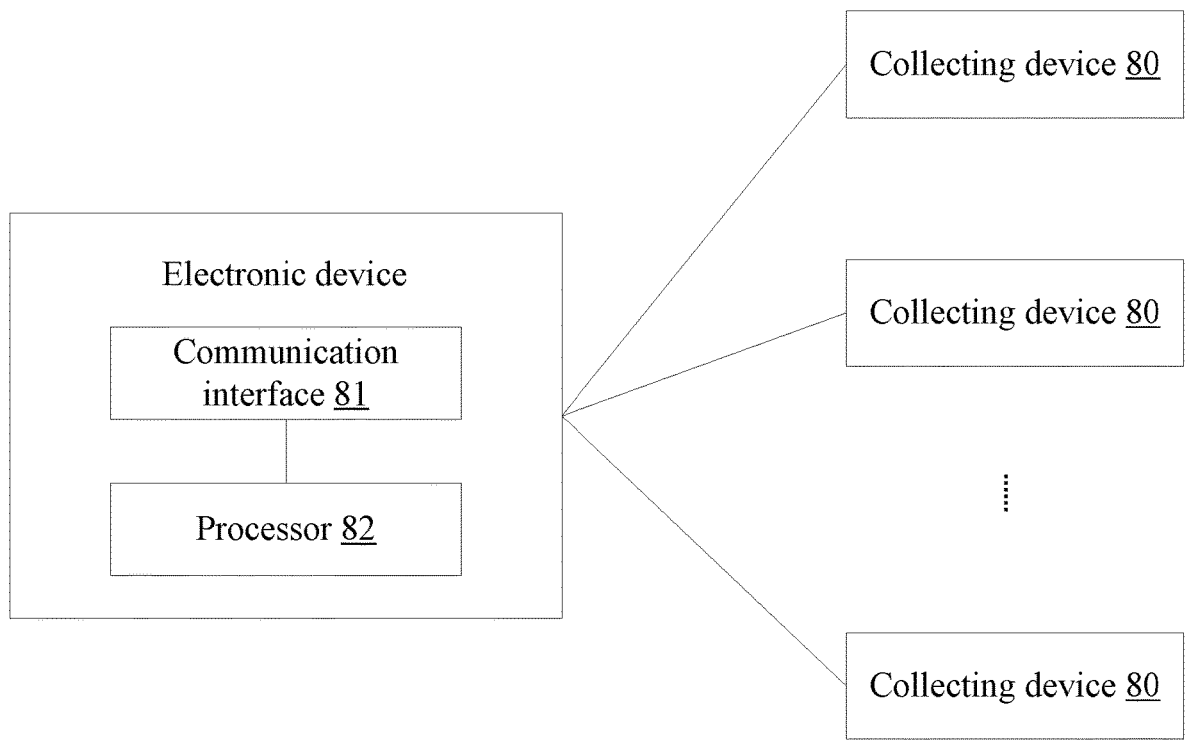
FIG. 8 illustrates a schematic structural diagram of an electronic device consistent with the disclosure.

FIG. 8 illustrates a schematic structural diagram of an electronic device consistent with the disclosure. The electronic device may correspond to the aforementioned first device, and may be a computer, a server, etc. As shown in FIG. 8, the electronic device includes a communication interface 81 and a processor 82. Further, the electronic device may be connected to at least two collecting devices 80.

More specifically, the communication interface 81 may be configured for acquiring voice data, and the voice data herein refers to voice data collected by the at least two collecting devices 80 from a voice source. During the process that the at least two collecting devices 80 collect the voice data of the voice source, the relative positions of the voice source with respect to the at least two collecting devices 80 may change.

Further, the processor 82 may be configured for acquiring a recognition result of the voice data, where the recognition result corresponds to the voice generated by the voice source. Further, the processor 82 may be configured for, in response to the recognition result, executing a corresponding command.

In one embodiment, the processor 82 may be specifically configured for, when the voice data of the voice source collected by the at least two collecting devices 80 includes the same voice content, determining the collecting device 80 closest to the voice source as a target collecting device. Further, the processor 82 may use the voice data collected by the target collecting device 80 as to-be-recognized voice data.

In one embodiment, the processor 82 may be specifically configured for, when the voice data of the voice source collected by the at least two collecting devices 80 includes different voice contents, stitching the voice data collected by the collecting devices 80 based on a sequence of timings that the voice data is collected as the to-be-recognized voice data.

In one embodiment, the processor 82 may be further configured for, when the stitched voice data includes a first content and a second content and the first content and the second content included in the stitched voice data are the same and have overlapping collection time periods, selecting a target content satisfying a preset condition from the first content and the second content, and replacing the first content and the second content with the target content.

In one embodiment, the processor 82 may be specifically configured for, based on the voiceprint property of the voice source, determining to-be-stitched collecting devices 80, and for the to-be-stitched collecting devices 80, stitching the voice data collected by the to-be-stitched collecting device 80 based on the sequence of timings that the voice data is collected.

In one embodiment, the processor 82 may be specifically configured for, when the voice data of the voice source collected by the at least two collecting devices 80 include different voice contents, determining the to-be-stitched collecting devices 80 based on the voiceprint property of the voice source. Further, for the to-be-stitched collecting devices 80, the first device processor 82 may be configured for identifying the voice data collected by the to-be-stitched collecting devices 80 based on the sequence of timings that the voice data is collected.

Further, the communication interface 81 may be configured for sending the identified voice data to a second device (e.g., a back-end device), such that the second device stitches the voice data. The communication interface 81 may further receive the recognition result sent by the second device and send the recognition result to the processor 82.

In one embodiment, the processor 82 may be further configured for determining an executing device that matches the voice source as a target executing device, or determining the executing device based on a configured operation. The communication interface 81 may be further configured for sending a command corresponding to the recognition result to the target executing device.

In one embodiment, the collecting device may include two collecting states: a keyword collecting state and a command collecting state. The communication interface 81 may be further configured for acquiring a wake-up keyword, where the wake-up keyword is obtained by analyzing the collected voice data by the at least one collecting device in the keyword collecting state. The processor 82 may be further configured for determining at least two to-be-awakened collecting devices.

The communication interface 81 may be further configured for sending an awakening command to the at least two collecting devices, thereby controlling the at least two collecting devices to switch from the keyword-collecting status to the command-collecting status. The communication interface 81 may be further configured for receiving the voice data collected by the at least two collecting devices in the command-collecting status.

Those skilled in the relevant art shall understand that, the functions implemented by each component of the electronic device illustrated in FIG. 8 may be understood with reference to the aforementioned processing methods. The function of each unit in the electronic device illustrated in FIG. 8 may be implemented through one or more programs running on the processor, or may be implemented by one or more specific logic circuits.

Without conflict, the technical solutions described above may be combined with each other. In the embodiments provided by the present disclosure, it should be understood that the disclosed method and device may be implemented through other manners.

The devices described above are for illustrative purposes. For example, the division of the unit may be merely a logic function division, and in practical implementation, other division modes may be applied. For example, a plurality of units or components may be combined, or may be integrated into a system, or some features may be neglected or left unexecuted.

Further, the coupling, direct coupling, or communication connection between each displayed or discussed component part may be realized through certain interfaces. The indirect coupling or communication connection between devices or units may be in forms of electrical or mechanical, or in other manners.

As separated parts, the above-illustrated units may be or may not be physically separated. The parts displayed as units may or may not be physical units. That is, the parts may be located in one place, or may be distributed over a plurality of network units. Some or all of the units may be selected to realize the objective of the disclosed solutions based on the actual need.

Further, each function unit in embodiments of the present disclosure may be integrated into one second processing unit, or each unit may be individually treated as one unit. Further, two or more units may be integrated as one unit. The aforementioned integrated units may be implemented using the hardware mode, or using a mode combining the hardware and software functional units.

Although the present disclosure is illustrated and described with reference to example embodiments, those skilled in the relevant art should understand that, without departing from the spirit and scope of the present disclosure, various changes may be made to the present disclosure in the manner and detail.

Therefore, the scope of the present disclosure shall not be limited to the aforementioned embodiments, but shall not be only determined by the appended claims, but may be further defined by equivalents of the appended claims.

What is claimed is:

1. A processing method, comprising:
   acquiring voice data, the voice data being collected by at least two collecting devices from a voice source that generates a sound, each of the at least two collecting devices including a plurality of microphones forming one or more microphone arrays for performing signal processing locally;
   calculating a distance between the voice source and each of the at least two collecting devices based on different timings that the sound reaches the plurality of microphones;
   stitching the voice data based on a sequence of timings at which the voice data are collected to generate stitched voice data, the stitched voice data including first voice data and second voice data adjacent to each other in the sequence and being collected by different ones of the at least two collecting devices;
   analyzing frequencies of the stitched voice data to determine whether a similarity between a first frequency waveform of the first voice data and a second frequency waveform of the second voice data exceeds a threshold;

determining, in response to determining that the similarity exceeds the threshold, that the stitched voice data includes a first content corresponding to the first frequency waveform and a second content corresponding to the second frequency waveform, the first content and the second content being the same as each other and being collected by different ones of the at least two collecting devices during two time periods that overlap with each other;

selecting, according to the calculated distance, one of the first content and the second content that is collected by one of the at least two collecting devices closer to the voice source as a target content; and replacing the first content and the second content with the target content to obtain to-be-recognized voice data for recognition;

acquiring a recognition result of the to-be-recognized voice data, the recognition result corresponding to a voice generated by the voice source; and in response to the recognition result, executing a corresponding command.

2. The method according to claim 1, wherein stitching the voice data based on the sequence of timings at which the voice data is collected to generate the stitched voice data includes:

determining to-be-stitched collecting devices from the at least two collecting devices based on a voiceprint property of the voice source; and stitching the voice data collected by the to-be-stitched collecting devices based on a sequence of timings at which the voice data is collected by the to-be-stitched collecting devices.

3. The method according to claim 1, further comprising:
determining one of the at least two collecting devices that is closest to the voice source as a target collecting device; and
determining the voice data collected by the target collecting device as to-be-stitched voice data.

4. The method according to claim 1, further comprising:
determining to-be-stitched collecting devices based on a voiceprint property of the voice source;
identifying the voice data collected by the to-be-stitched collecting devices based on a sequence of timing at which the voice data is collected by the to-be-stitched collecting devices; and
sending the identified voice data to a back-end device for stitching the identified voice data.

5. The method according to claim 1, wherein in response to the recognition result, executing the corresponding command includes:
determining an executing device that matches the voice source as a target executing device; and
sending the corresponding command to the target executing device.

6. The method according to claim 1, wherein in response to the recognition result, executing the corresponding command includes:
determining a target executing device based on a configured operation; and
sending the corresponding command to the target executing device.

7. The method according to claim 1, further comprising:
acquiring a wake-up keyword obtained by analyzing the voice data collected by at least one of the at least two collecting devices that is in a keyword collecting state;
determining at least two to-be-awakened collecting devices according to the wake-up keyword; and sending an awakening command to the at least two to-be-awakened collecting devices to control the at least two to-be-awakened collecting devices to switch from the keyword collecting state to a command collecting state, wherein acquiring the voice data includes receiving the voice data collected by the at least two to-be-awakened collecting devices after switching to the command collecting state.

8. The method according to claim 1, wherein the one of the first content and the second content that is selected as the target content has higher strength than another one of the first content and the second content.

9. The method according to claim 1, further comprising:
in response to determining that the stitched voice data does not include the first content and the second content, determining the stitched voice data as the to-be-recognized voice data.

10. The method according to claim 1, wherein:
in a process of collecting the voice data of the voice source by the at least two collecting devices, a relative location of the voice source changes with respect to the at least two collecting devices.

11. An electronic device comprising:
a processor communicatively coupled to at least two collecting devices, each of the at least two collecting devices including a plurality of microphones forming one or more microphone arrays for performing signal processing locally, wherein the processor:
acquires voice data collected by the at least two collecting devices from a voice source,
calculates a distance between the voice source and each of the at least two collecting devices based on different timings that the sound reaches the plurality of microphones;
stitches the voice data based on a sequence of timings at which the voice data are collected to generate stitched voice data, the stitched voice data including first voice data and second voice data adjacent to each other in the sequence and being collected by different ones of the at least two collecting devices,
analyzes frequencies of the stitched voice data to determine whether a similarity between a first frequency waveform of the first voice data and a second frequency waveform of the second voice data exceeds a threshold,
determines, in response to determining that the similarity exceeds the threshold, that the stitched voice data includes a first content corresponding to the first frequency waveform and a second content corresponding to the second frequency waveform, the first content and the second content being the same as each other and being collected by different ones of the at least two collecting devices during two time periods that overlap with each other,
selects, according to the calculated distance, the first content and the second content that is collected by one of the at least two collecting devices closer to the voice source as a target content, and
replaces the first content and the second content with the target content to obtain to-be-recognized voice data for recognition,
acquires a recognition result of the to-be-recognized voice data, the recognition result corresponding to a voice generated by the voice source, and
in response to the recognition result, executes a corresponding command.

12. The electronic device according to claim 11, wherein the processor further:
- determines to-be-stitched collecting devices from the at least two collecting devices based on a voiceprint property of the voice source; and
- stitches the voice data collected by the to-be-stitched collecting devices based on a sequence of timings at which the voice data is collected by the to-be-stitched collecting devices.

13. The electronic device according to claim 11, wherein the processor further:
- determines one of the at least two collecting devices that is closest to the voice source as a target collecting device, and
- determines the voice data collected by the target collecting device as to-be-stitched voice data.

14. The electronic device according to claim 11, wherein the processor further:
- determines to-be-stitched collecting devices based on a voiceprint property of the voice source;
- identifies the voice data collected by each collecting device based on a sequence of timings at which the voice data is collected by the to-be-stitched collecting devices; and
- sends the identified voice data to a back-end device for stitching the identified voice data.

* * * * *